(12) United States Patent
Onodera et al.

(10) Patent No.: US 7,376,540 B2
(45) Date of Patent: May 20, 2008

(54) ANALYTICAL SHELL-MODEL PRODUCING APPARATUS

(75) Inventors: Makoto Onodera, Tsuchiura (JP); Yoshimitsu Hiro, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 680 days.

(21) Appl. No.: 10/627,607

(22) Filed: Jul. 28, 2003

(65) Prior Publication Data

US 2004/0186604 A1 Sep. 23, 2004

(30) Foreign Application Priority Data

Mar. 20, 2003 (JP) ............................ 2003-077390

(51) Int. Cl.
*G06F 17/50* (2006.01)
*G06F 19/00* (2006.01)
*G06G 7/48* (2006.01)

(52) U.S. Cl. .................. 703/1; 703/7; 700/98; 700/118

(58) Field of Classification Search .................... 703/1, 703/7; 700/98, 118
See application file for complete search history.

(56) References Cited

U.S. PATENT DOCUMENTS 7,002,575 B2 * 2/2006 Tonooka ..................... 345/424
7,038,700 B2 * 5/2006 Kawaguchi et al. ........ 345/646

FOREIGN PATENT DOCUMENTS

| JP | 06-259505 | 9/1994 |
| JP | 2002-207777 | 7/2002 |
| WO | WO 98/43179 | 10/1998 |

OTHER PUBLICATIONS

Mobley, Carroll, and Canann. An Object Oriented Approach to Geometry Defeaturing for Finite Element Meshing. 1998. Proceedings of 7th International Meshing Roundtable. p. 547-563.*
D.J. Sheehy et al., "Computing the Medial Surface of a Solid From a Domain Delaunay Triangulation," Dept of Mechanical and Manufacturing Engineering, Queen's University of Belfast, Ireland, 1995, pp. 201-212.
European Search Report issued in corresponding European Patent Application No. EP 03016614.4-2224, dated May 14, 2007.
Rezayat, Mohsen, "Midsurface abstraction from 3D solid models: general theory and applications," Computer-Aided Design, vol. 28, No. 11, pp. 905-915, Elsevier Science, Ltd. 1996.
Deitz, Dan, "Optimizing Injection-molded parts," Mechanical Engineering, pp. 89-90, Oct. 1996.
Dvorak, Paul, "Software lets molders make every shot count," Machine Design, Feb. 6, 1997.

* cited by examiner

*Primary Examiner*—Paul Rodriguez
*Assistant Examiner*—Juan C. Ochoa
(74) *Attorney, Agent, or Firm*—McDermott Will & Emery LLP

(57) ABSTRACT

An analytical shell-model producing apparatus for converting a three-dimensional model into internal surfaces, wherein an internal surface is used to represent each three-dimensional element of the three-dimensional model. Each internal surface comprises a bounded plane and an associated width attribute, wherein the bounded plane is located internal to the three-dimensional element which it represents, and wherein the associated width attribute represents the width of the three-dimensional element in a direction normal to the bounded plane.

5 Claims, 17 Drawing Sheets

FIG.12 (A)
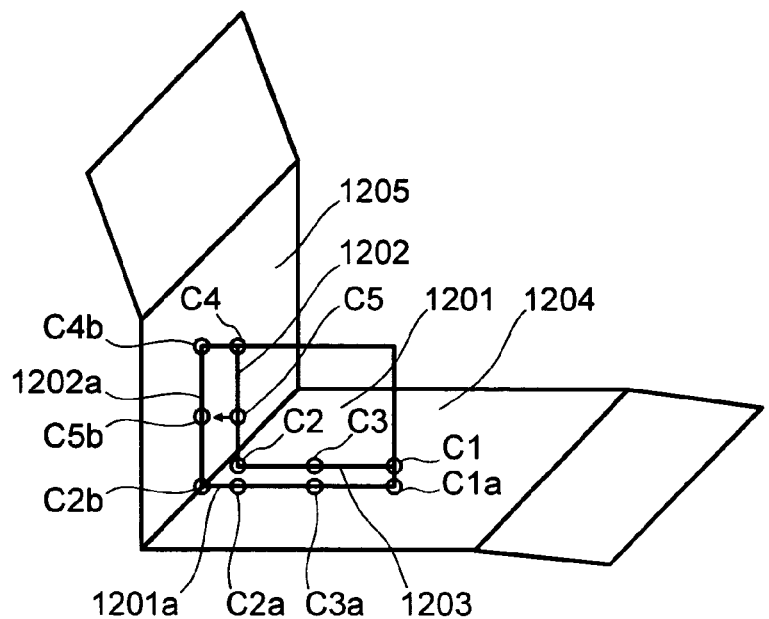
FIG.12 (B)
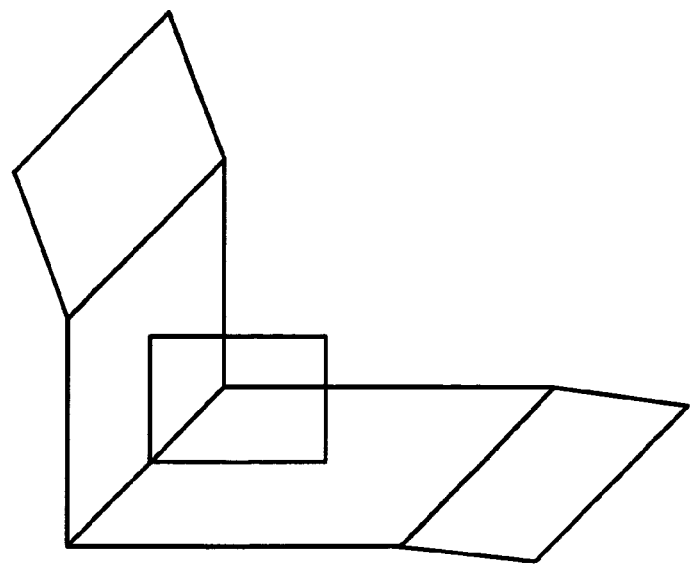

ANALYTICAL SHELL-MODEL PRODUCING APPARATUS

BACKGROUND OF THE INVENTION

The present invention relates to an analytical shell-model producing apparatus for producing a shell-model for use in analyzing from a solid-state model of a thin-plate structure, and it relates to, in particular, the analytical shell-model producing apparatus, being suitable to be used in a CAE (Computer Aided Engineering) for simulating physical phenomenon by means of numerical values, through the numerical analysis with using a computer.

In the numerical analysis, being represented by, such as, the finite-element method, for example, a model is made up with aggregation of elements, such as, a hexahedron and/or a tetrahedron, for example, as the material to be a target of analyzing (i.e., an analysis target). Also, in a case where the target material of analyzing has a thin-plate structure, a load on computing thereof can be reduced by utilizing a tetragon element and/or a triangle element, to which is given thickness as an attribute value thereof. When using a three(3)-dimensional CAD system, since a material (i.e., a configuration model) was already produced as for the analysis target, therefore even the configuration model of the thin-plate structure is defined to be a solid having thickness.

Conventionally, in a method for producing such a shell-model for use in analyzing from the solid-model of thin-plate structure, as is described in Japanese Patent Laying-Open No. Hei 6-259505 (1994) <JP-A 6-259505>, for example, a thin plate-like configuration portion is designated as the configuration model to be the target of numerical analysis, and then a surface is extracted, which has a geometric feature of being parallel to the surface, among surfaces connecting to the configuration designated. The surfaces, being in parallel with the surface extracted and also being shortest in the distance therebetween, are specified as a pair, and a medial-surface is produced with respect to the pair of surfaces, thereby producing the analysis model.

Also as one of other methods, being described in Japanese Patent Laying-Open No. 2002-207777 (2002) <JP-A 2002-207777>, for example, a hollow mesh model having a two(2)-layer structure is produced for the configuration model to be the target of numerical analysis. And, upon basis of a moving vector set up upon the shape, it is moved while deciding whether a node of the model is in contact with or not, on an element opposing thereto. With this, the nodes of the model are gathered at a neutral point, thereby producing a neutral surface model. However, the neutral surface indicates a surface, being a thin plate-like and located at a neutral position, and it is an equivalent of the shell-model for use in analyzing.

However, in the method for producing the shell-model for use in analyzing, which is described in the Japanese Patent Laying-Open No. Hei 6-259505, for example, since an operator must give an instruction to the thin film-like configuration part, and also only the surface contacting in parallel with the configuration instructed comes to be a target of producing the neutral surface, the operator must give instructions a number of times to that configuration, in particular, if it is a complicated configuration model, and/or a configuration having a rib, for example, and therefore it is not easy to produce the shell model for use in analyzing.

Also, in the method for producing the shell-model for use in analyzing, which is described in the Japanese Patent Laying-Open No. 2002-207777, for example, since the medial-surface model is not produced in the form of the configuration model, but in that of the configuration model, it is necessary to re-produce the configuration model from the mesh data when changing the configuration, such as, for the purpose of parameter survey, etc. Also, sometimes there are cases where the configuration model cannot be produced if trying to produce it again, since the configuration is too complicated.

BRIEF SUMMARY OF THE INVENTION

An object, according to the present invention, is to provide an analysis shell-model producing apparatus, being able to produce a shell-model for use in analyzing, with ease and in the form of the configuration model.

For accomplishing the object mentioned above, according to the present invention, there is provided an analytical shell-model producing apparatus for producing an analytical shell-model to be use in numerical analyzing, for a configuration model, which is produced by a three-dimensional configuration modeler, comprising: a reference-plate thickness inputting means for inputting a reference-plate thickness size to be used when specifying a thin-plate portion from the configuration model; a pair-surfaces acknowledging means for acknowledging two (2) surfaces, being equal or less than the reference-plate thickness size, which is inputted by said reference-plate thickness inputting means, in face-to-face distance between the arbitrary two (2) surfaces constructing the configuration model; a top/bottom side rib attribute acknowledging means for acknowledging the pair of surfaces acknowledged by said pair surface acknowledging means to be one of a top side surface, a bottom side surface, and a rib surface; an offset-surface producing means for producing an offset-surface by offsetting a group of surfaces of either the top or the bottom side, which are acknowledged by said top/bottom side rib attribute acknowledging means, and the rib surface, respectively, in direction of a normal line directing in an inside of the configurations thereof; a seam-surface producing means for seaming between the offset-surface, which is produced from either the top or the bottom surface by means of said offset-surface producing means, and the offset-surface produced from the rib surface; and an internal-surface producing means for registering the offset-surface seamed by said seam-surface producing means, as in a form of an internal-surface model. With this apparatus, it is easy to produce an analytical shell-model from a configuration model.

Preferably, according to the present invention, there is also provided the analytical shell-model producing apparatus, as described in the above, further comprising a top/bottom rib attribute emphatic displaying means for displaying the top side surface, the bottom side surface and the rib surface, which are acknowledged by said top/bottom side rib attribute acknowledging means, with making emphasis thereon, or further comprising a dialog top/bottom side rib attribute amending means for amending the top side surface, the bottom side surface and the rib surface, which, are acknowledged by said top/bottom side rib attribute acknowledging means, in a manner of dialog, or wherein said internal-surface model producing means calculates the plate thickness on each of the internal-surface models as targets from the face-to-face distance between two (2) surfaces of the pair, to which a composite surface of the configuration model belongs, being as an original for producing the each internal-surface model, thereby giving this plate thickness value as to be the thickness attribute of the internal-surface model of target.

Further, according to the present invention, for accomplishing other object mentioned above, there is provided an analytical shell-model producing apparatus, for producing an analytical shell-model for use in numerical analyzing from a configuration model, which is produced by a three-dimensional configuration modeler, comprising: a reference-plate thickness size inputting means for inputting a reference-plate thickness size to be used when specifying a thin-plate portion from the configuration model; and means for making two (2) surfaces, being narrower therebetween than the reference-plate thickness size, which is inputted from said reference-plate thickness inputting means, in a pair of surfaces, producing an offset-surface between the pair of surfaces, and producing an internal-surface model by seaming on an outer periphery portion of the offset-surface.

Moreover, according to the present invention, for accomplishing other object mentioned above, there is provided an analytical shell-model producing apparatus, for producing an analytical shell-model for use in numerical analyzing from a configuration model, which is produced by a three-dimensional configuration modeler, comprising: a reference-plate thickness size inputting means for inputting a reference-plate thickness size to be used when specifying a thin-plate portion from the configuration model; and means for producing a thickness attribute of said internal-surface model from face-to-face distance between the surfaces of said pair and a value of the plate thickness.

BRIEF DESCRIPTION OF THE SEVERAL VIEWS OF THE DRAWING

FIGS. 2 to 17 are views for explaining functions of various parts of the analytical shell-model producing apparatus shown in FIG. 1, and in particular, FIG. 2 is a view of a size-designation screen for thickness of a reference plate, in a reference plate thickness size-designation portion;

FIGS. 3 and 4 are views for showing a flowchart of processing of pair-surface acknowledging, and for explaining the pair-surface acknowledging process by means of a pair-surface acknowledging portion;

FIGS. 5 and 6 are views for showing a flowchart of processing for acknowledging a rib by means of a top/bottom side rib acknowledging portion, and for explaining the acknowledge processing of the rib;

FIGS. 7 to 9 are views for explaining a neighboring graph, which is used in the rib acknowledging process by means of the top/bottom side rib acknowledging portion, a flowchart of the top/bottom side rib acknowledging process, and the top/bottom side rib acknowledging, respectively;

FIGS. 10 and 11 are views for showing a flowchart of the processing for producing offset-surface by means of an offset-surface producing portion, and for explaining the offset-surface producing process;

FIGS. 12(A) and 12(B) are views for explaining the offset-surface producing process by means of a seam-surface producing portion;

FIGS. 13(A) to 13(D) are views for explaining an emphatic displaying process on the top/bottom side rib attribute, by means of a top/bottom side rib attribute emphatic displaying portion;

FIGS. 14 to 16 are views for showing amending processing with using a dialog top/bottom side rib attribute amending portion, and in particular, FIG. 14 is a view for showing the amending processing of the top/bottom side rib attribute, and FIGS. 15(A) to FIG. 16(C) are views for explaining the amending process of the top/bottom side rib attribute, in more details thereof; and FIG. 17 is a view for explaining an internal-surface model, which is displayed by an internal-surface model displaying portion.

DETAILED DESCRIPTION OF THE INVENTION

Figure 1:
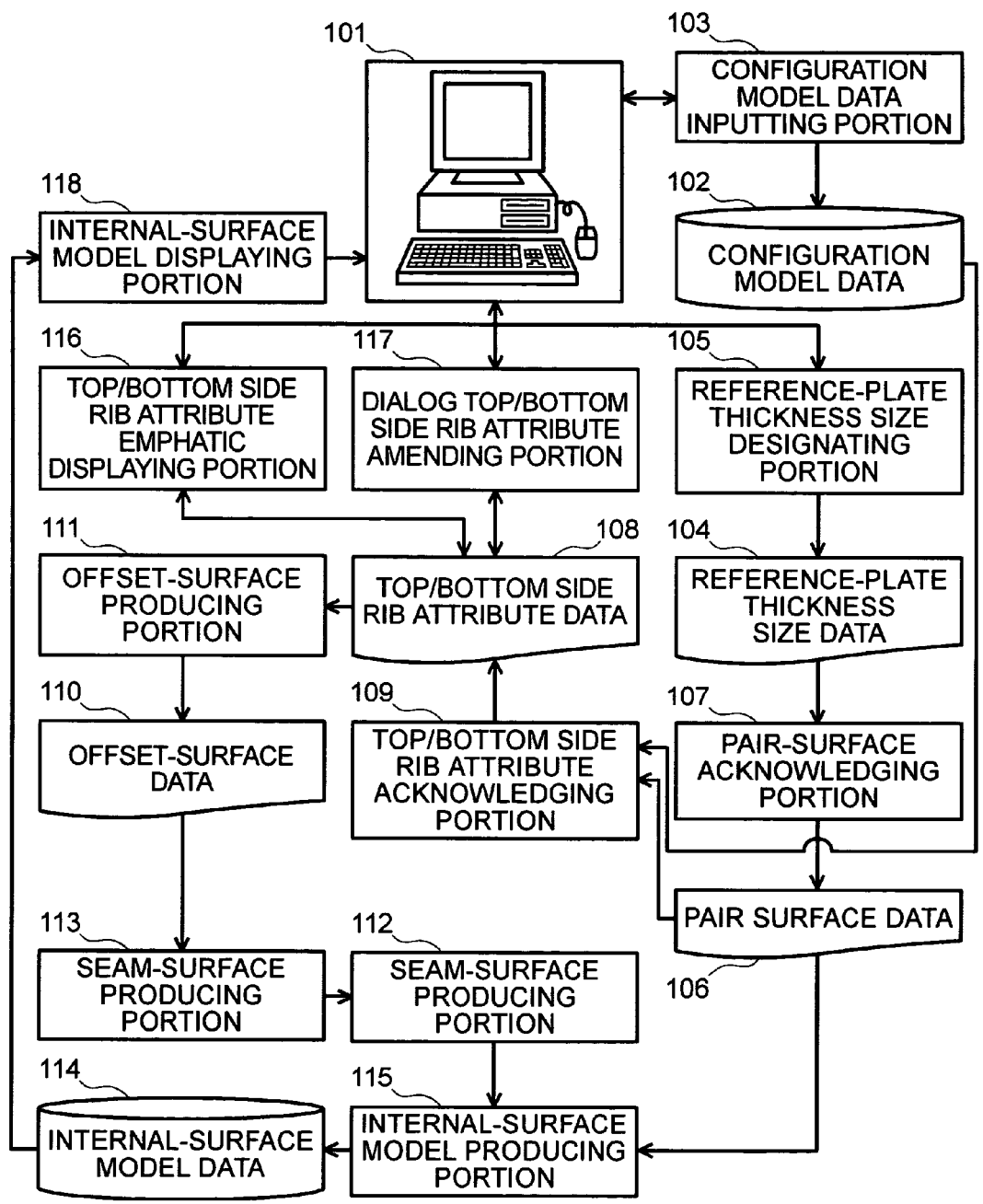
FIG. 1 is a system structure view of an embodiment of an analysis shell-model producing apparatus, according to the present invention.

Hereinafter, explanation will be given about the structure and operation of an analytical shell-model producing apparatus, according to one embodiment of the present invention, by referring to FIGS. 1 to 17. Herein, FIG. 1 is a view for showing the system structure of the analytical shell-model producing apparatus. The analytical shell-model producing apparatus, according to the present embodiment, comprises an input/output device 101, a reference plate thickness designating portion 105, a pair-surface acknowledging portion 107, a top/bottom side rib attribute acknowledging portion 109, an offset-surface producing portion 111, a seam-surface producing portion 113, an internal-surface model producing portion 115, a top/bottom side rib attribute emphatic displaying portion 116, a dialog top/bottom side rib attribute amending portion 117, and an internal-surface model displaying portion 118.

The input/output portion 101 is used for a system user to make an input therewith or a display thereon, and it comprises a keyboard, a pointing device, and/or a display, etc. A configuration model inputting portion 103 inputs a configuration model therewith, and it also registers it in the form of a configuration model data 102.

The reference-plate thickness designating portion 105 inputs a size of reference-place thickness, for acknowledging as a thin-plate portion from the configuration model, and then registers this reference-plate thickness size as in the form of a reference-plate thickness size data 104. An example of the reference-plate thickness designation portion 105 will be mentioned by referring to FIG. 2, later.

The pair-surface acknowledge portion 107 acknowledges two (2) surfaces as a pair of surfaces from arbitrary two (2) surfaces building up the configuration model data 102, which is equal or less than the reference-plate thickness size data 104 in the face-to-face distance between those surfaces, and then registers it in the form of a pair-surface data 106. A method for acknowledging the pair-surface by means of the pair-surface acknowledging portion 107 will be mentioned later.

The top/bottom side rib attribute acknowledging portion 109 acknowledges a top-side surface, a bottom-side surface and also a rib surface from the configuration model data 102 and the pair-surface data 106, and registers them as in the form of a top/bottom side rib attribute data 108. The offset-surface producing portion 111 produces offset-surfaces, offsetting one of the surface groups, i.e., the top-side surfaces or the bottom-side surfaces, in a direction of the normal line directing into an inside of each of the configuration thereof, and then registers them as in the form of an offset-surface data 110.

The seam-surface producing portion 113 produces a seam-surface, which seams between the offset-surface data 110 produced from either the top or bottom surface and also the offset-surface data 110 produced from the rib surface, and then registers it as in the form of a seam-surface data 112. The internal-surface model producing portion 115 registers the seam-surface data 112 as in the form of internal-surface model data 114. In addition to the seam-surface data, a value of plate thickness of the each target internal-surface model is calculated from the face-to-face distance between the surfaces in the pair-surface data 106, to which the component surface of the configuration model belongs, being an original of each internal-surface model, and then this plate thickness value is given as a thickness attribute of the target internal-surface model.

The top/bottom side rib attribute emphatic displaying portion 116 displays the surface, which is registered in the top/bottom side rib attribution data 108, on a display of the input/output device 101 with making emphasis thereon. An example of the emphatic display by means of the top/bottom side rib attribute emphatic displaying portion 116 will be mentioned by referring to FIGS. 13(A) to 13(D), later. The dialog top/bottom side rib attribute amending portion 117 amends the top/bottom side rib attribute data 108, by using the input/output device 101.

The internal-surface model producing portion 118 displays the internal-surface model stored in the internal-surface model data 114 on the display of the input/output device 101. The internal-surface model is data of the three-dimensional model, being same to the configuration data (a solid model), such as, the CAD data, for example.

Figure 2:
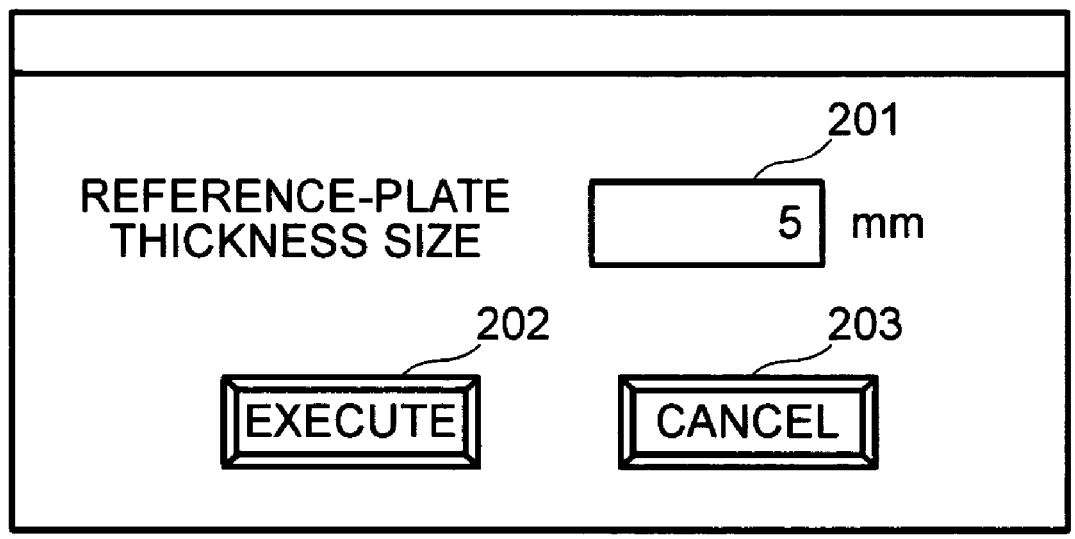

By referring to FIG. 2 will be explained a method for designating the reference-plate thickness size by means of the reference-plate thickness size designating portion 105 of the analytical shell-model producing apparatus. FIG. 2 is a view of the screen structure of a screen designated for the reference-plate thickness size by means of the reference-plate thickness size designating portion 105. The reference-plate thickness size designating portion 105 displays an operation screen for the purpose of designation of the reference-plate thickness size, as shown in FIG. 2, on the display of the input/output device 101. A user of the apparatus inputs the size of the reference-plate thickness, for acknowledging to be the thin-plate portion, into the reference-plate thickness size inputting field 201 on the operation screen, by using the input/output device 101.

The size of the reference-plate in the thickness thereof is the thickness size to be referred as a reference for deciding the thin portion among the configuration model data. For example, if there are places where the plate thickness is defined to be 2 mm, 3 mm, and 5 mm, and if it is desired to determine such the potions to be the thin-plate portion, for example, the maximum value among them, i.e., 5 mm is inputted into the reference-plate thickness size inputting field 201, for example. When the user of the apparatus pushes an execute button 202, the numerical data inputted in the reference-plate thickness size inputting field 201 is registered into the reference-plate thickness size data 104. Or if pushing a cancel button 203, the designation will be released.

Figure 3:
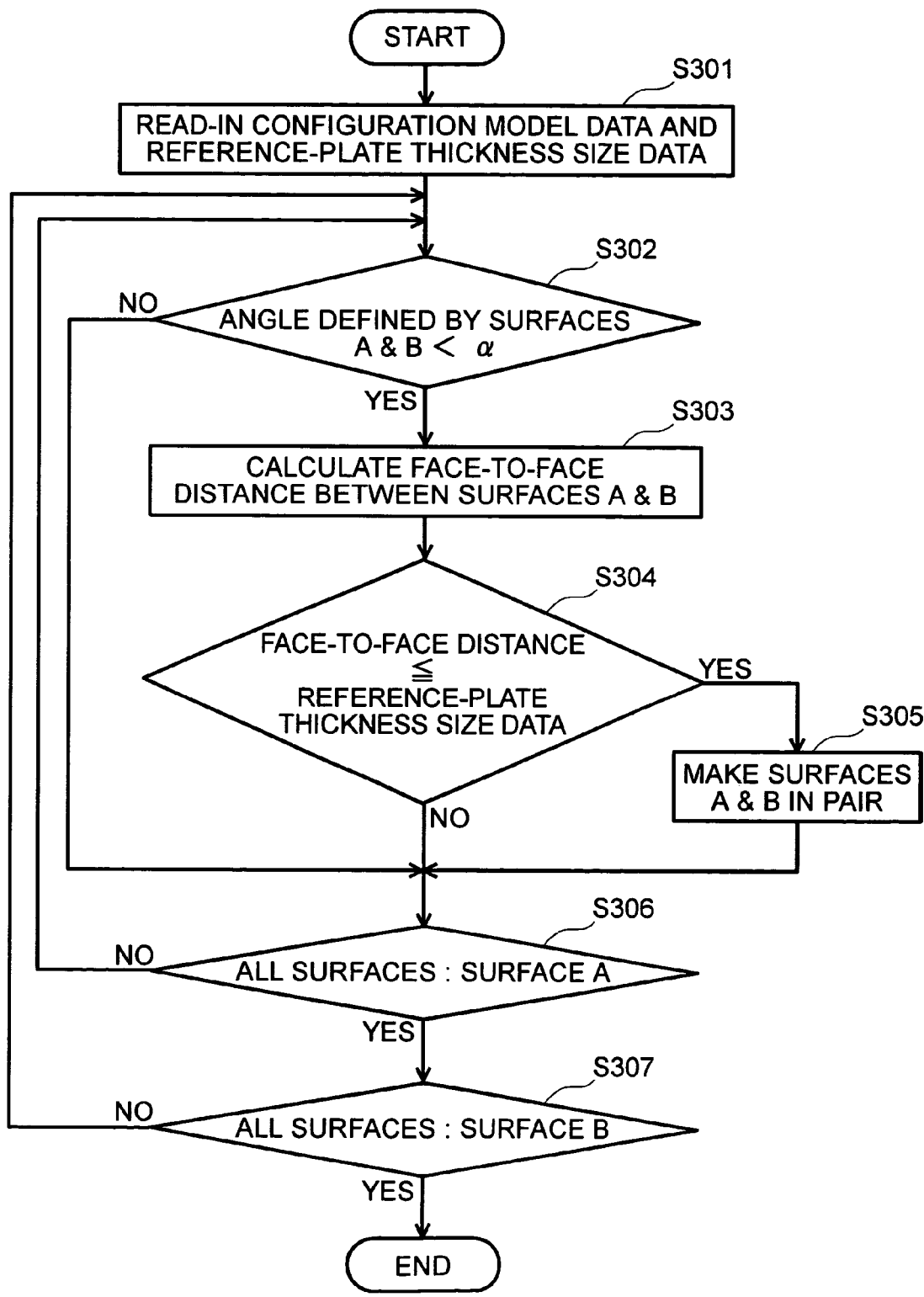
Figure 4:
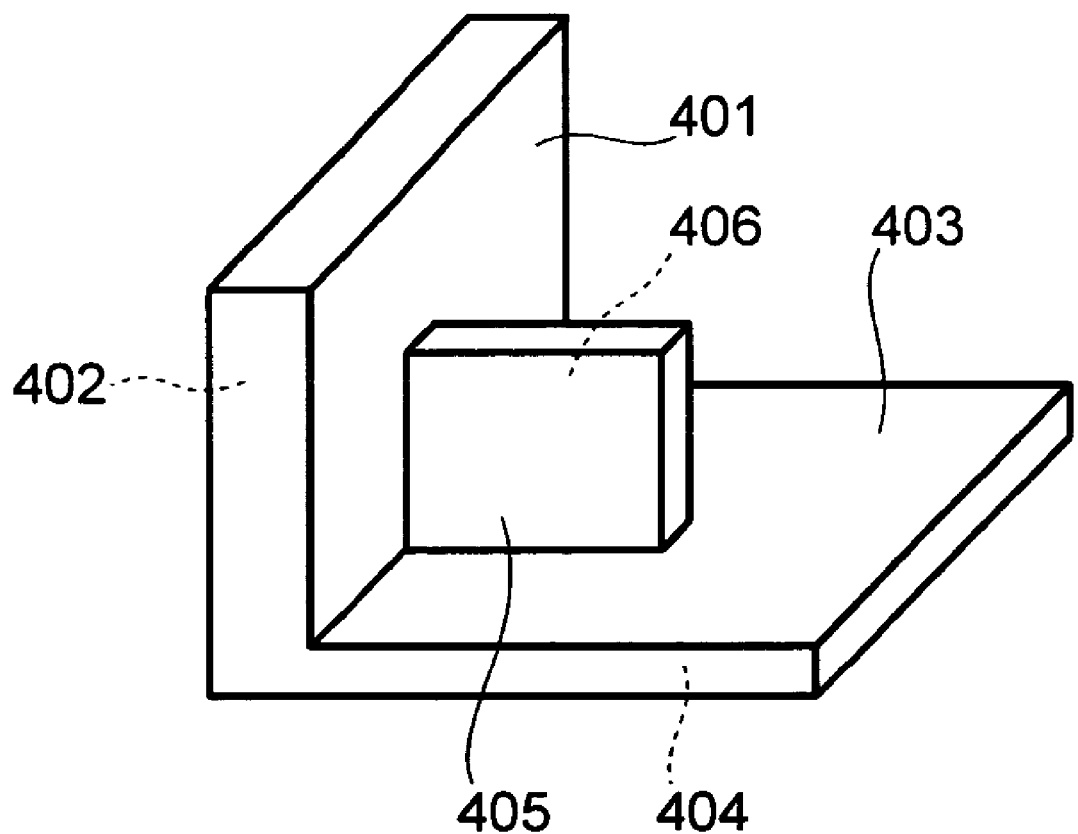

Explanation will be given on the processing in the pair-surface acknowledging process by means of the pair-surface acknowledge portion 107, in the analysis shell-model producing apparatus, by referring to FIGS. 3 and 4. Herein, FIG. 3 is a flowchart for showing the processing by means of the pair-surface acknowledging portion 107. FIG. 4 is an explanatory view of the pair-surface acknowledging process by means of the pair-surface acknowledging portion 107.

In a step s301, the pair-surface acknowledging portion 107 reads therein the configuration model data 102 and the reference-plate thickness size data 104. In a step s304, two (2) surfaces (i.e., the surface A and the surface B) are selected, sequentially, from all of the surfaces constructing the configuration model data 102, and determines whether an angle defined by those surfaces A and B is smaller than a predetermined angle α or not. It is assumed that the predetermined angle α is 30 degree, for example. If being equal or less than the predetermined angle α, they can be determined to be the surfaces being parallel to each other or the surface formed with a taper thereon, and then the process advances to a step s303. If not, it jumps to a step s306.

In the case when the angle defined between the surfaces A and B is equal or less than the angle α, the face-to-face distance is calculated out between those two (2) surfaces, in a step s303. In a step s304, this face-to-face distance is compared to the reference-surface thickness size data 104, and if the face-to-face distance between those surfaces is smaller than the reference-surface thickness size data 104, then those two (2) surfaces are determined to the pair-surface in a step s305. For example, with respect to the configuration model shown in FIG. 4, if the reference-plate thickness size is designated to be 5 mm, for example, then the surfaces; i.e., (surface 401)-(surface 402), (surface 403)-(surface 404), and (surface 405)-(surface 406) are the pair-surfaces. Herein, wave-like broken lines indicating the surfaces 402, 404 and 406 show the surfaces on the bottom side. Thus, the surface 402 is the surface opposing to the surface 401, the surface 404 opposing to the surface 403, and the surface 406 opposing to the surface 405.

In the step s305, the processes in the above steps s302-s305 are repeated on all of the surfaces A. For example, if the surface 401 is selected to be the surface A, while the surface 402 to be the surface B, in FIG. 4, then the surfaces 403, 404, 405 and 406 are changed sequentially to be as the surfaces A while keeping the surfaces B fixed, and the pair-surface is selected, judging from viewpoints of the angle defined between the surfaces each other and the face-to-face distance of surfaces.

In a step s306, the similar processing to that in the step s 305 is repeated. However, in this step s306, the processing is made on all of the surfaces B. Namely, it is assumed that the surface 401 is selected to be the surface A and the surface 402 to be the surface B, in FIG. 4. Then, in this step s306, after selecting the pair-surfaces from the angle defined between the surfaces each other and the face-to-face distance therebetween, by changing the surfaces 403, 404, 405 and 406, sequentially, into the surface A, then the pair-surface is selected from the angle defined between the surfaces each other and the face-to-face distance therebetween, while changing the surfaces 403, 404, 405, 406 and 401, sequentially, into the surface B. With doing this, a mutual relationship can be checked on all of the surfaces shown in FIG. 4, and thereby enabling detection of all the pair-surfaces, without omitting.

Figure 5:
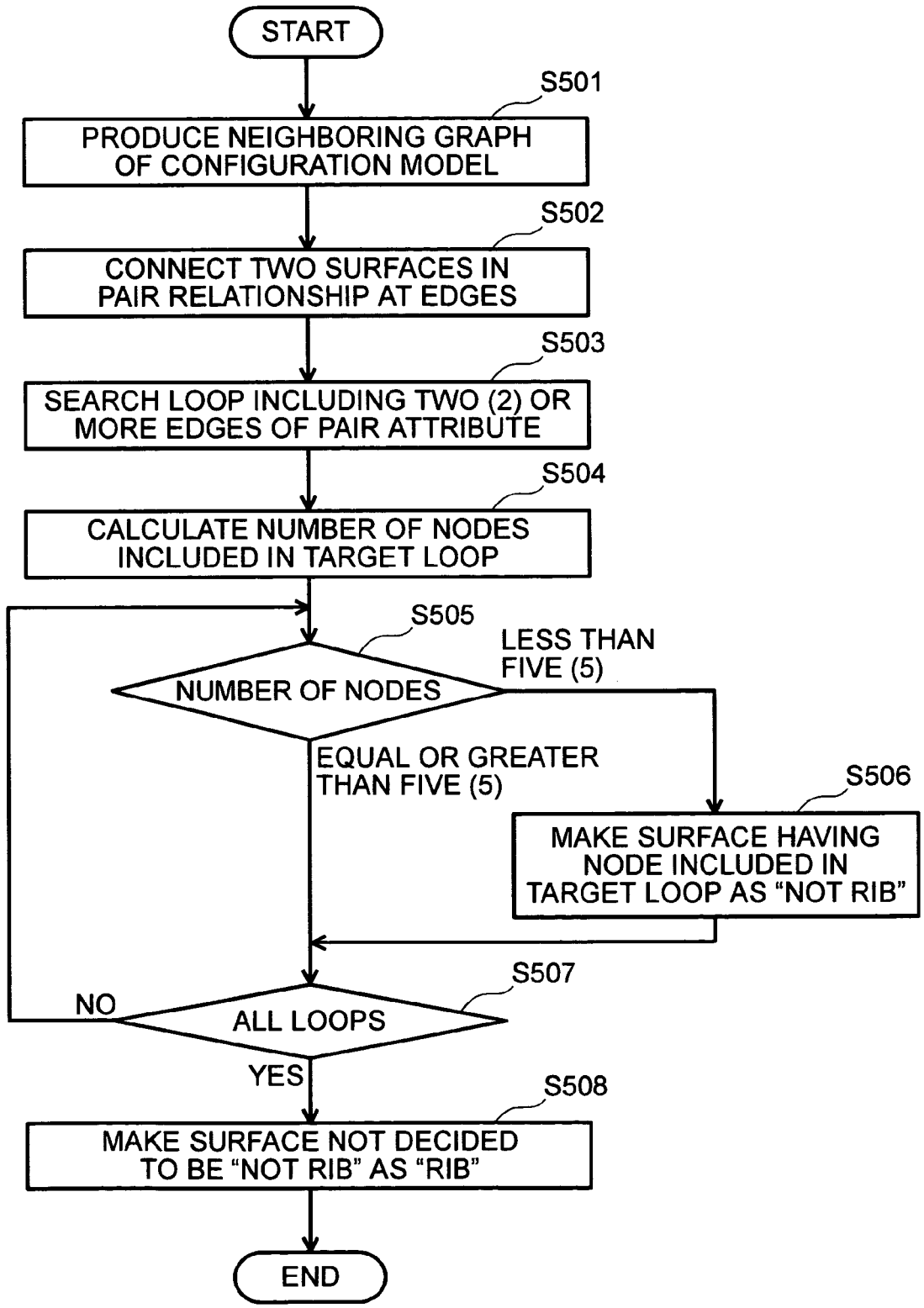
Figure 6:
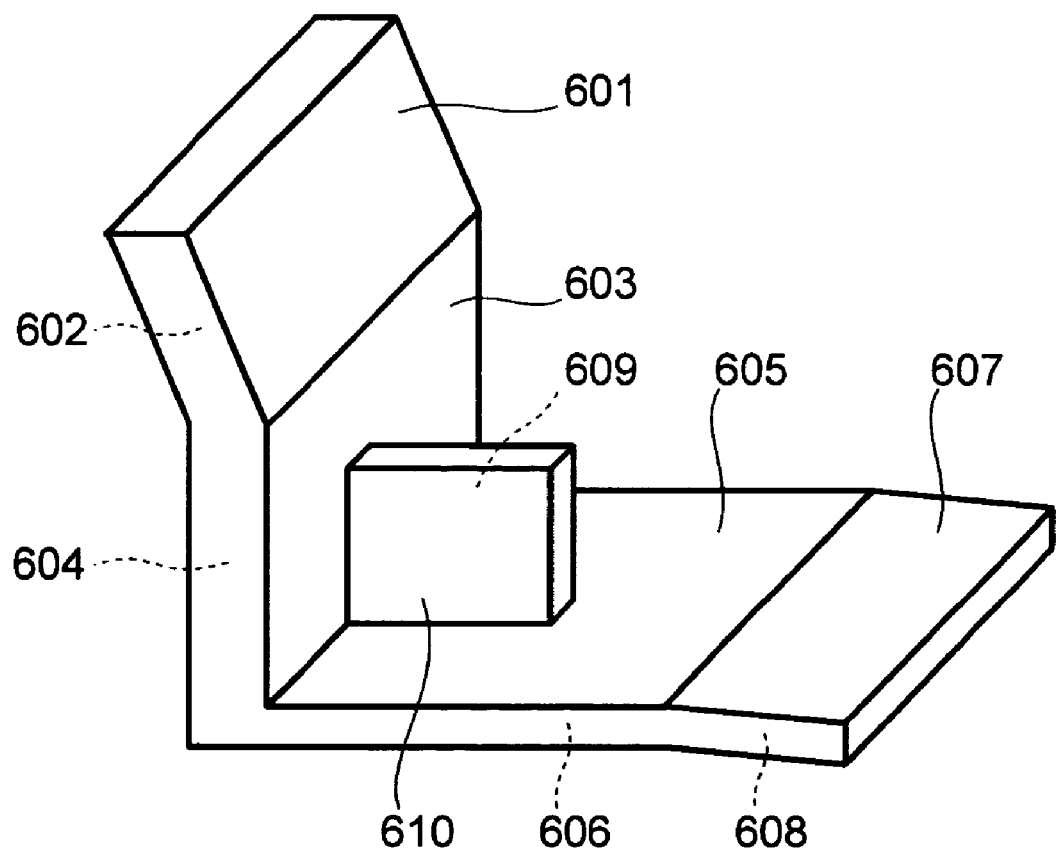

Explanation will be given about the processing in the acknowledging process, on the top and bottom sides and also the rib, by means of the top/bottom side rib acknowledging portion 109 in the analytical shell model producing apparatus, by referring to FIGS. 5 to 9. By using FIGS. 5 to 7, the processing in the acknowledging process on the rib, by means of top/bottom side rib acknowledging portion 109 will be explained. Herein, FIG. 5 is a flowchart for showing the processing in the acknowledging process on the rib, by means of the top/bottom side rib acknowledging portion 109. FIG. 6 is an explanatory view for the acknowledging process on the rib, by means of the top/bottom side rib acknowledging portion 109. And, FIG. 7 is an explanatory view of a neighboring graph, which is used in the rib acknowledging process by means of the top/bottom side rib-acknowledging portion 109.

In a step s501 shown in FIG. 5, the top/bottom side rib acknowledging portion 109 produces a graph, in which nodes to the surfaces neighboring with each other are connected with each other at edges thereof, assuming the surface to be a node, for the configuration model data 102. This graph is called by "neighboring graph", hereinafter. FIG. 7 shows the neighboring graph with respect to the configuration model shown in FIG. 6.

Figure 7:
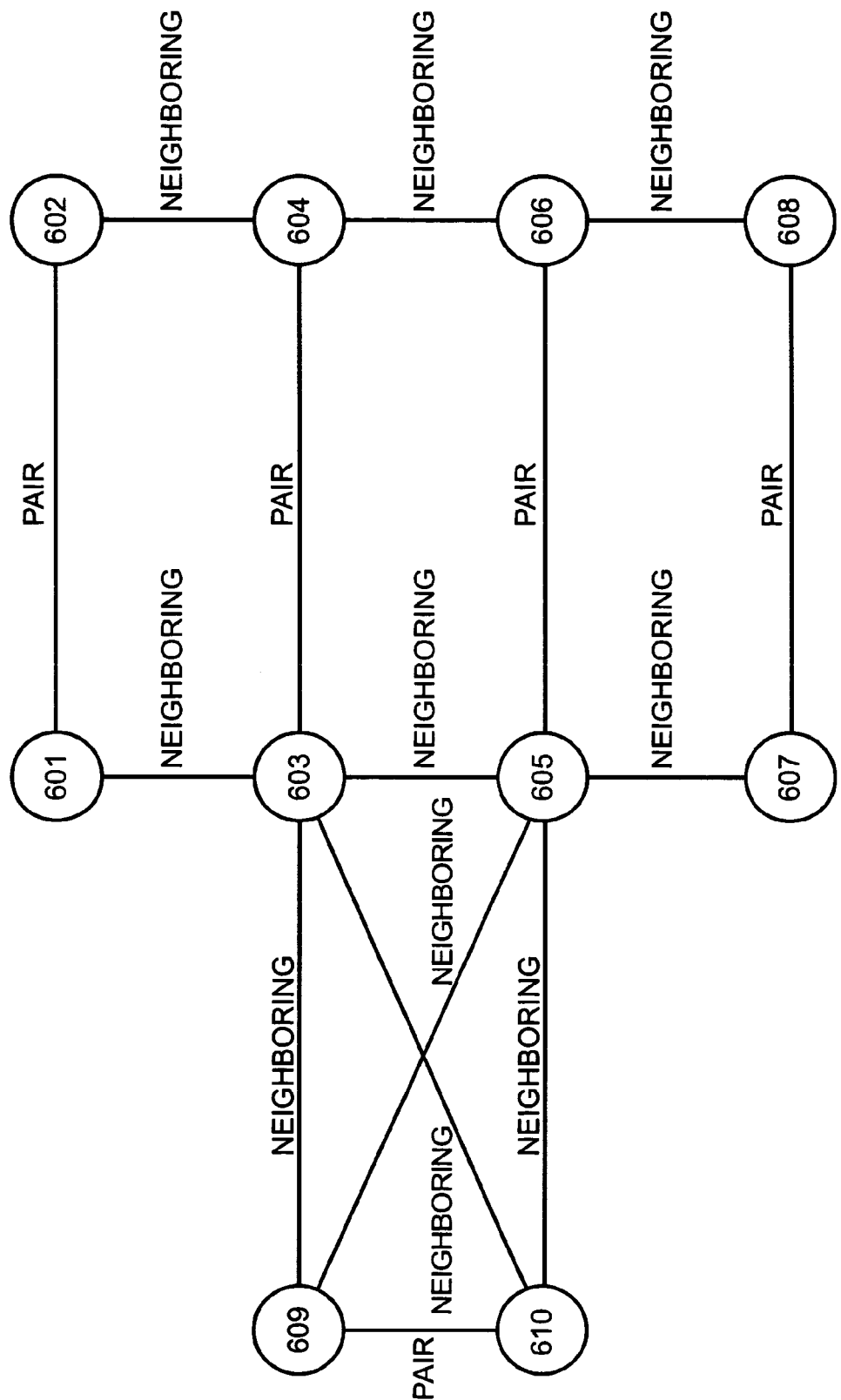

In the configuration model shown in FIG. 6, the surfaces, i.e., (surface 601)-(surface 603)-(surface 605)-(surface 607), are neighboring with each other, respectively, therefore (node 601)-(node 603)-(node 605)-(node 607) shown in FIG. 7 are connected with each other at the edges thereof. Herein, a character "neighboring" is attached on a side of the edge, and thereby indicating that both nodes are in a relationship of the surfaces neighboring with each other. Also, the surfaces, i.e., (surface 602)-(surface 604)-(surface 606)-(surface 608) shown in FIG. 6, are neighboring with each other, respectively, and therefore they are the nodes, i.e., (node 602)-(node 604)-(node 606)-(node 608) shown in FIG. 7, and are connected with, at neighboring edges thereof. Further, since the surface 609 is also neighboring with the surfaces 603 and 605, then the node 609 is connected with the nodes 603 and 605 at the neighboring edges thereof. Also, since the surface 601 is neighboring with the surfaces 603 and 605, the node 610 is connected with the nodes 603 and 605 at the neighboring edges thereof.

In a step s502, for this neighboring graph, the surfaces are connected at the edges thereof, which are in a relationship of the pair-surface. In the configuration model shown in FIG. 6, the surfaces, i.e., (surface 601)-(surface 602) constitute the pair-surface, and therefore the nodes, i.e., (node 601)-(node 602) in FIG. 7 are connected at the edges thereof. Herein, the character "pair" is attached on a side of the edge, and it indicates that both nodes are in relationship of the pair-surface between them. In the similar manner, the surfaces, i.e., (surface 601)-(surface 602), (surface 603)-(surface 604), (surface 605)-(surface 606), (surface 607)-(surface 608), and (surface 609)-(surface 610), constitute the pair-surfaces, respectively, and then they are connected with at pair-edges.

In a step s503, search is conducted on a loop from the neighboring graph, including at least two (2) or more of the edges of pair attributes. For the loop, since there is a condition that it includes at least two (2) or more pair attributes, the loop made up with the nodes, i.e., (node 601)-(node 602)-(node 604)-(node 603), is that which is searched out. On the other hand, the loop made up with the nodes, i.e., (node 609)-(node 603)-(node 605)-(node 610), contains only one pair attribute, therefore it comes off from the loops to be the searching target. However, the loop made up with the nodes, i.e., (node 9)-(node 603)-(node 604)-(node 606)-(node 605)-(node 610), includes two (2) pair attributes therein, therefore it comes to be the target of the searching.

In a step s504, calculation is made on the number of the nodes, which lie within this loop. In a step s505, a determination is made on whether the number of pieces of the nodes is less than five (5) or not. If the number of pieces of the nodes is less than five (5), the nodes within the loop are determined to have the rib attribute in a step s506. If the number of pieces of the nodes is equal to five (5) or more, the nodes within the loop are determined to have no such the rib attribute in a step s507.

For example, in the configuration model shown in FIG. 6, the number of nodes is less than five (5) lying within the loop <<601-602-604-603>>, and then it is decided to be "not the rib". And, a flag, "not the rib" is attached to the surfaces 601, 602, 603 and 604. On the other hand, the number pieces of the nodes exceeds for (4) laying within the loop <<609-610-605-606-604-603>>, then the process advances to the step s507.

In the step s507, the processes in the steps s505 and s506 mentioned above are executed on all of the loops. The surface that was not determined to be "not the rib", i.e., that not attached with the flag "not the rib" is determined to be the "rib", in a step s508. For example, within the loop <<609-610-605-606-604-603>>, since the surfaces 603, 604, 605 and 606 are determined to not the rib, therefore it is determined that the surfaces 609 and 610 are the ribs.

Figure 8:
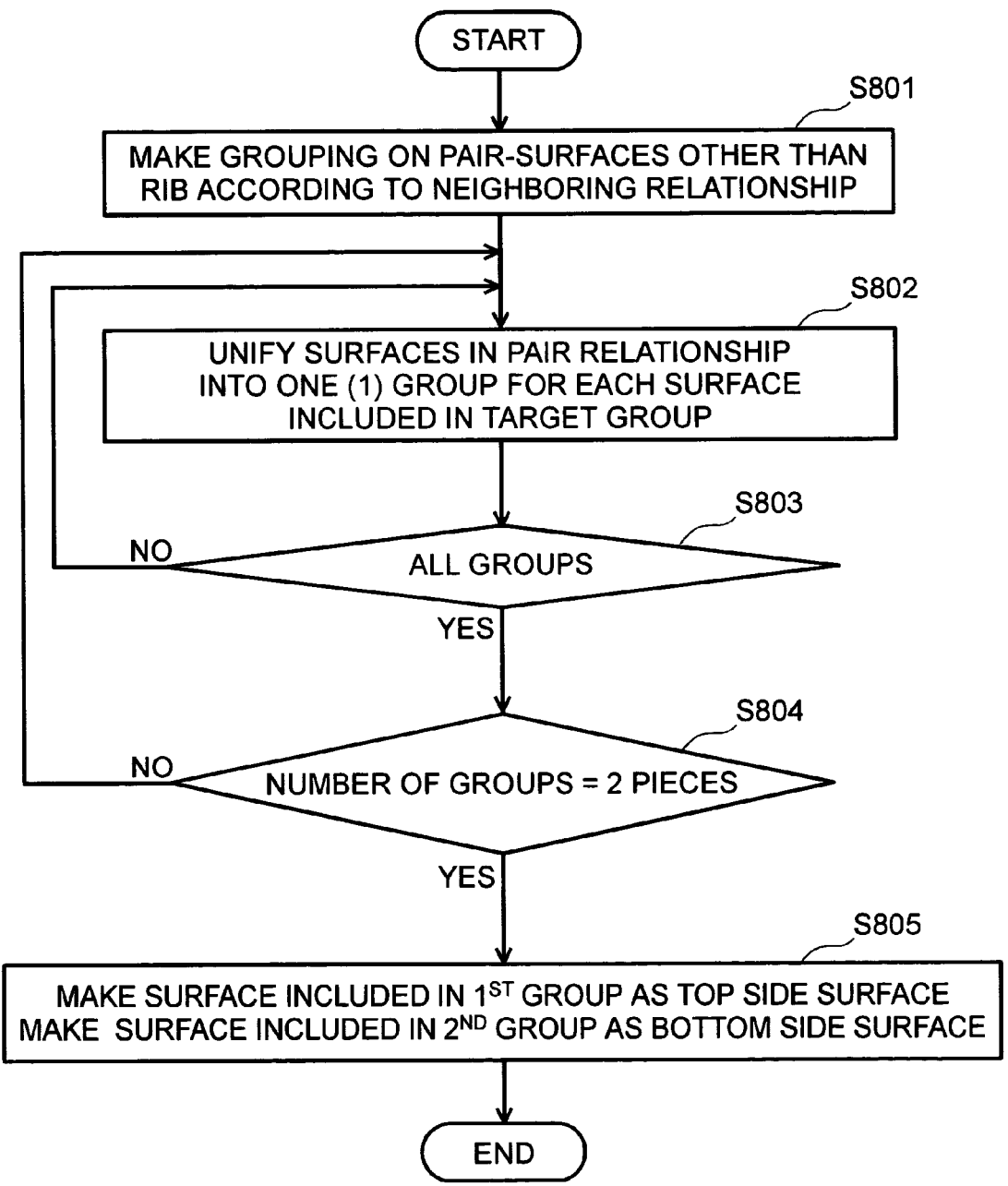
Figure 9:
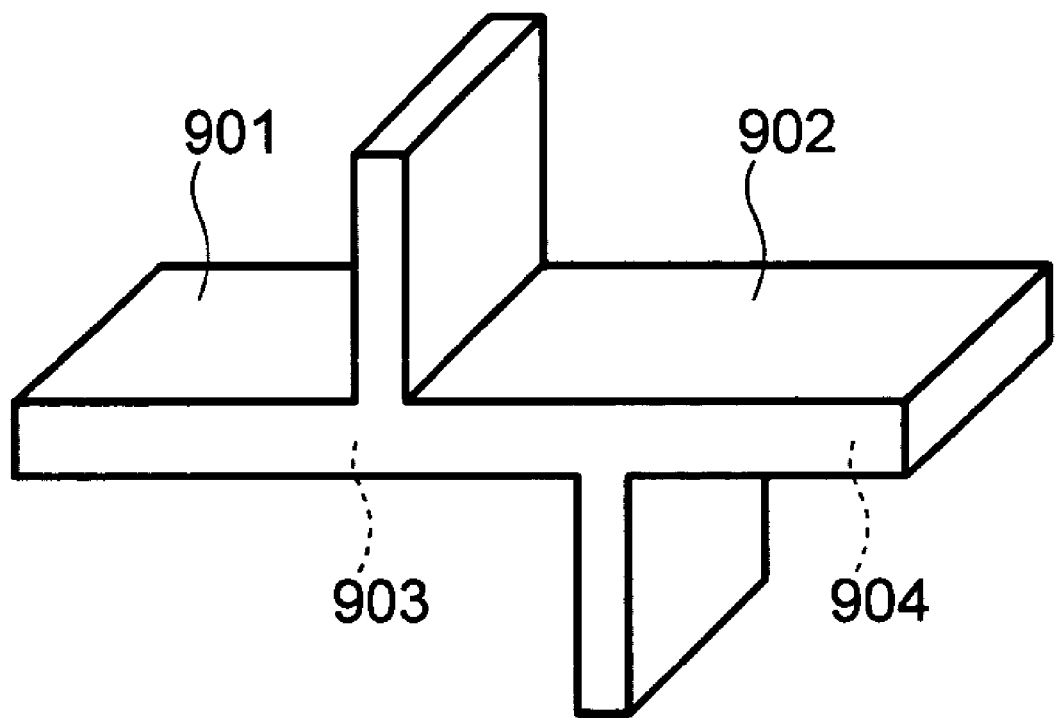

Explanation will be given on the processing of the acknowledging process on the top/bottom side surface, by means of the top/bottom sided rib acknowledging portion 109 in the analytical shell-model producing apparatus, by referring to FIGS. 8 and 9. FIG. 8 is a flowchart for showing the processing of the acknowledging process on the top/bottom side surface, by means of the two-sided rib acknowledge portion 109. FIG. 9 is a view for explaining the acknowledging process on the top/bottom side surface, by means of the two-sided rib acknowledge portion 109.

In a step s801, the top/bottom rib acknowledge portion 109 makes a grouping on the surfaces, which are themselves in the neighboring relationship, for each of the pair-surfaces that are not acknowledged to be the rib. For example, in FIG. 9, the respective surfaces 901, 902, 903 and 904 are not in such the neighboring relationship therebetween therefore they are grouped in the flowing manner, thereby to be included into the independent groups, respectively:

Group 1: the surface 901;
Group 2: the surface 902;
Group 3: the surface 903; and
Group 4: the surface 904.

In a step s802, if the groups are equal or more than two (2) in pieces thereof, an arbitrary one of the group is extracted from all of the groups, and then the surfaces are combined with each other, which are in the relationship of the pair, thereby to be unified into one group, for each of the surfaces included in that group. In an example shown in FIG. 9 mentioned above, for example, the surface 901 is in the pair with the surface 903 of the group 3, and the surface 902 is also in the pair, then the surfaces 901 and 902 are unified together. In the similar manner, since the surface 903 is also in the pair with the surface 902 of the group 3, and the surface 904 is also in the pair, then the surfaces 903 and 904 are unified with each other. As a result of this, i.e., repeating this unifying of the groups in accordance with the relationships of the pairs, the groups are as follows:

Group 1: the surface 901 and the surface 902; and
Group 2: the surface 903 and the surface 904.

In a step s803, the process of the step s802 is repeated on all of the groups. Further, in a step s804, it is repeated until when the number of the groups comes down to be two (2), remaining as a result of the unifying. When the group comes down to two (2) in the number of pieces thereof, then the group of surfaces in one group is made to be a top side surface, while that of the other group a bottom side surface. For example, in the example mentioned above, it is as follows:

Top side surface: the surface 901 and the surface 902; and
Bottom side surface: the surface 903 and the surface 904.

Figure 10:
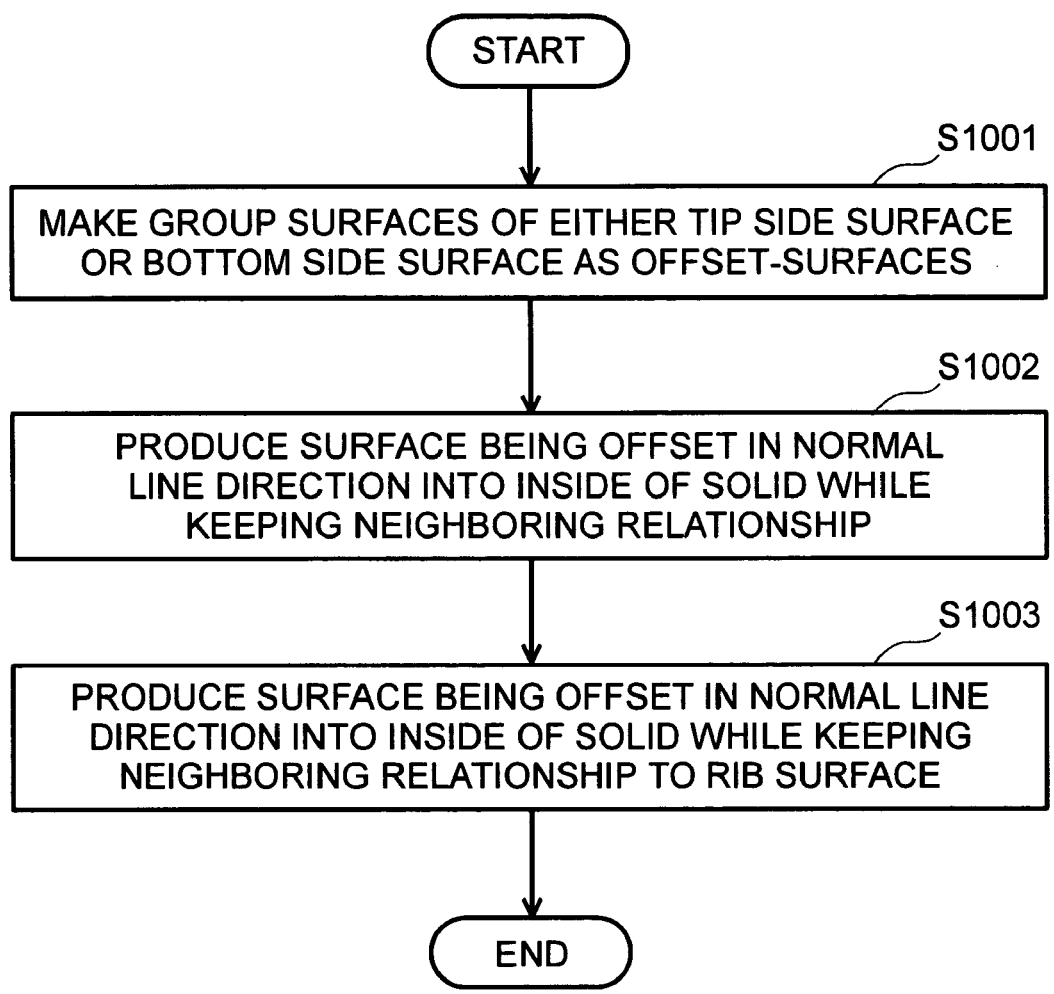
Figure 11:
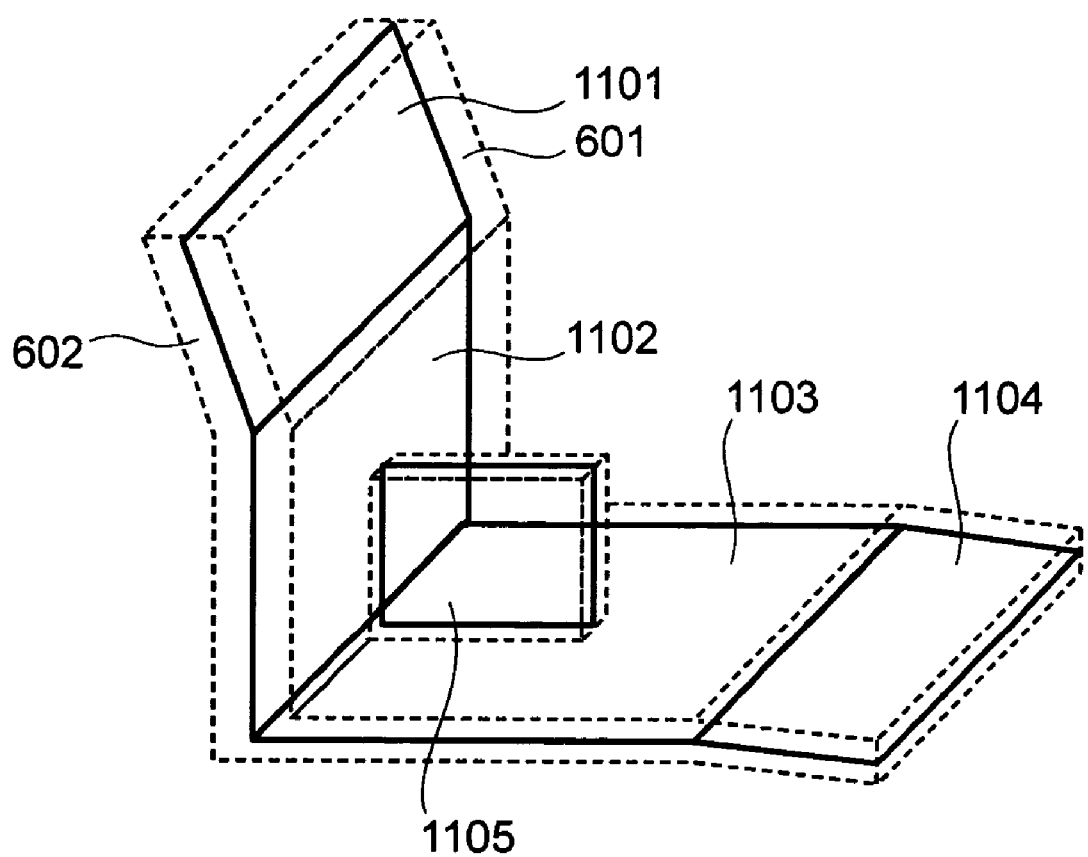

Explanation will be given on the processing of the offset-surface producing process, by means of the offset-surface producing portion in the analytical shell-model producing apparatus, by referring to FIGS. 10 and 11. Herein, FIG. 10 is a flowchart for showing the processing of the offset-surface producing process, by means of the offset-surface producing portion 111 in the analytical shell-model producing apparatus. FIG. 11 is a view for explaining the offset-surface producing process, by means of the offset-surface producing portion 111 in the analytical shell-model producing apparatus.

In a step s1101 in FIG. 10, the offset-surface producing portion 111 takes either the top or the bottom side surface, as to be a target of the offset-surface. Though it is possible to automatically determine this offset-surface on the apparatus side, but it is also possible to determine through designation on which side surface should be the target, by an operator. For example, in FIG. 11, the surface 601 is selected to be the target of the offset-surface if assuming the surfaces 601 and 602 form the pair-surfaces.

In a step s1102, a surface is produced, being offset in the direction of the normal line directing into an inside of a solid, while keeping the target surface of offsetting in a relationship with the surface. The CAD data, as to be the configuration data, has information in the solid, therefore it is possible to determine the inside direction of the solid by means of this CAD data. Herein, an amount of the offsetting is assumed to be ½ of the face-to-face distance between the surfaces, which form the pair. Further, if the face-to-face distance is changed, gradually, between the surfaces thereof, such as, in the case of the tapered surface, for example, it is determined to be ½ of an averaged value thereof. Regarding such the tapered surface, it may be determined to be ½ of the maximum value or the minimum value of the face-to-face distance between the surfaces. In this manner, in the example shown in FIG. 11, it is possible to obtain the offset-surface 1101 with respect to the surfaces 601 and 602.

In a step s1103, the process of the step s1003 is executed on the rib surface, in the similar manner, thereby producing the offset-surface of the rib. Hereinafter, the offset-surface produced from either the top or the bottom side surface is called by a "general offset-surface", while the offset-surface produced from the rib is called by a "rib offset-surface". In FIG. 11, the general offset-surfaces are the surfaces 1101, 1102, 1103 and 1104, and the rib offset-surface is the surface 1105, in the configuration model shown by broken lines.

Explanation will be given on the processing of the seam-surface producing process, by means of the seam-surface producing portion 113 in the analytical shell-model producing apparatus, by referring to FIGS. 12(A) and 12(B). As was shown in FIG. 11, on the configuration having the rib therein, the rib offset-surface and the general offset-surface are separated from. Then, the seam-surface producing portion 113 elongates the rib offset-surface to the general offset-surface, thereby treating the processing for seaming them together and registering as in the form of a seam-surface.

With respect to the offset-surface 1201 shown in FIG. 12(A), lines 1202 and 1203 are elongated up to the general offset-surface, thereby connecting between the general offset-surface and the rib offset-surface. A result of this is as shown in FIG. 12(B). As is shown in FIGS. 12(A) and 12(B), the surface 1201 is constructed with four (4) lines (sides), in general. Since one side of the surface 1201 can be defined by two control points C1 and C2 at both ends and a control point C3 at a middle portion thereof, first the points C1, C2 and C3 are elongated up to the general offset-surface 1204, thereby determining control points C1$a$, C2$a$ and C3$a$. Though it is also possible to define the second side of the surface 1202 by the control points C2 and C4 on both sides and the control point C5 at a middle portion thereof, however since a new control point C2$a$ is defined newly, the control points C2$a$, C4 and C5 are elongated up to the general offset-surface 1205, thereby determining control points C2$b$, C4$b$ and C5$b$. With this, the sides of the surfaces 1201 and 1202 are elongated up to the sides 1201$a$ and 1202$a$, to form a new surface, thereby combining the general offset-surface and the rib offset-surface together.

Hereinafter, explanation will be given on the processing of the internal-surface model producing process, by means of the internal-surface model producing portion 115. The internal-surface model producing portion 115 registers the seam-surface, which is produced in the seam-surface producing process by means of the seam-surface producing process portion 113, in the form of the internal-surface model data 114. Next, search is made on the pair-surfaces, to which belongs the component surface of the configuration model, being the original, from which this internal-surface model is offset as the offset-surface, for each of the internal-surface models. In the example shown in FIG. 11, the surfaces 601 and 602 are searched out as the pair-surfaces, to which this offset-surface belongs, for the offset-surface 1101.

The face-to-face distance between the two (2) surfaces, which are registered in that pair-surfaces is calculated out, and the internal-surface model data 114 is given with this face-to-face distance between the surfaces, as an attribute of thickness of the target internal-surface model. Herein, if the pair-surfaces are in a plural number thereof, which belong thereto, an averaged value of the face-to-face distances between the surfaces is given as the thickness attribute, or the minimum one or the maximum one. Also, for the pair-surfaces having a tapered surface, being not constant in the face-to-face distance therebetween, changes in the thickness are given to the internal-surface model, distributedly. Also, the thickness attribute given to the each internal-surface model is automatically distributed to each element when producing a mesh.

Explanation will be given on the processing of emphatic displaying process of the top/bottom side rib attribute, by means of the tip/bottom side rib attribute emphatic displaying portion 116, by referring to FIGS. 13(A) and 13(B). The top/bottom side rib attribute emphatic displaying portion 116 displays a display screen emphasized, as is shown in FIG. 13(A), on the input/output device 101. The user of the apparatus selects an attribute, which she/he wishes to display with making emphasis thereon, on an operation screen shown in FIG. 13(A), by using the input/output device 101. When wishing to display the top side surface, she/he selects a top side surface display button 1301, while when wishing to display the bottom side surface, a bottom side surface display button 1302, and when wishing to display the rib surface, a rib surface display button 1303.

Figure 13:
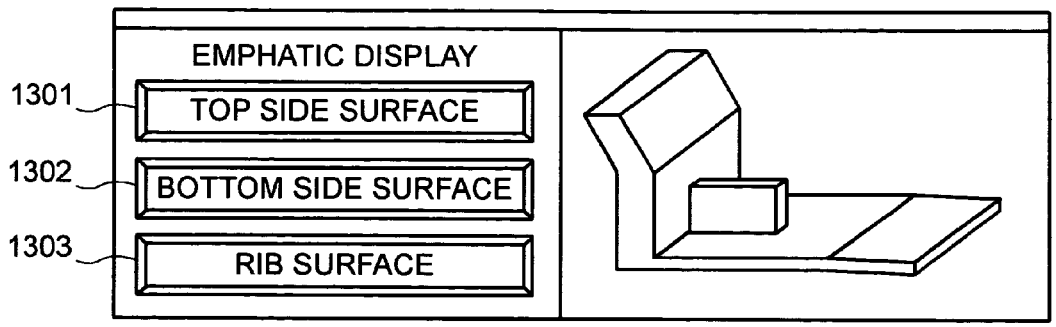
Figure 13:
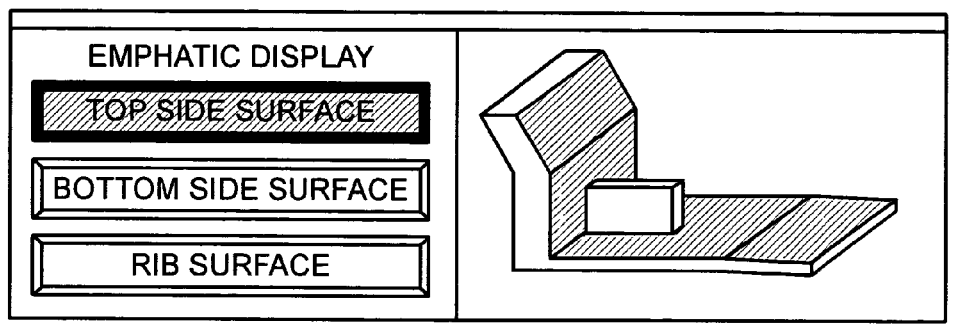
Figure 13:
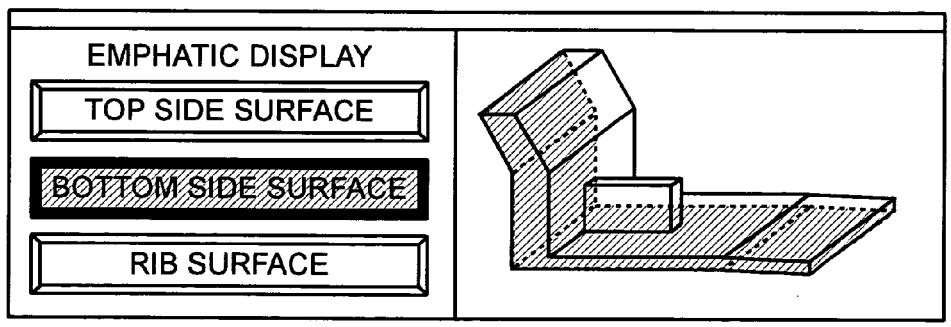
Figure 13:
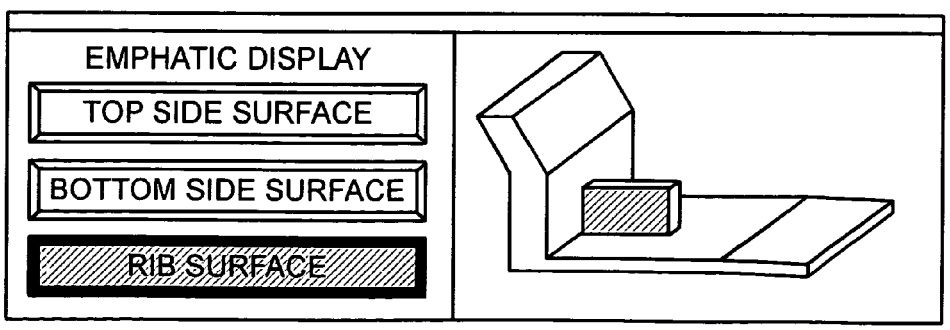

The top/bottom side rib attribute emphatic displaying portion 116 searches a surface, which is coincident with in the attribute, among the top/bottom side rib attribute data 108, and displays the surface, being coincident with in the search, on the screen with making emphasis thereon, as shown in FIGS. 13(B), 13 (C) and 13(D). For example, when the top side display button 1301 is selected, it is displayed in a manner as is shown in FIG. 13(B). When the bottom side surface display button 1302 is selected, it is displayed in a manner as is shown in FIG. 13(C). And, if the rib surface display button 1303 is selected, it is displayed in a manner as is shown in FIG. 13(D).

Figure 14:
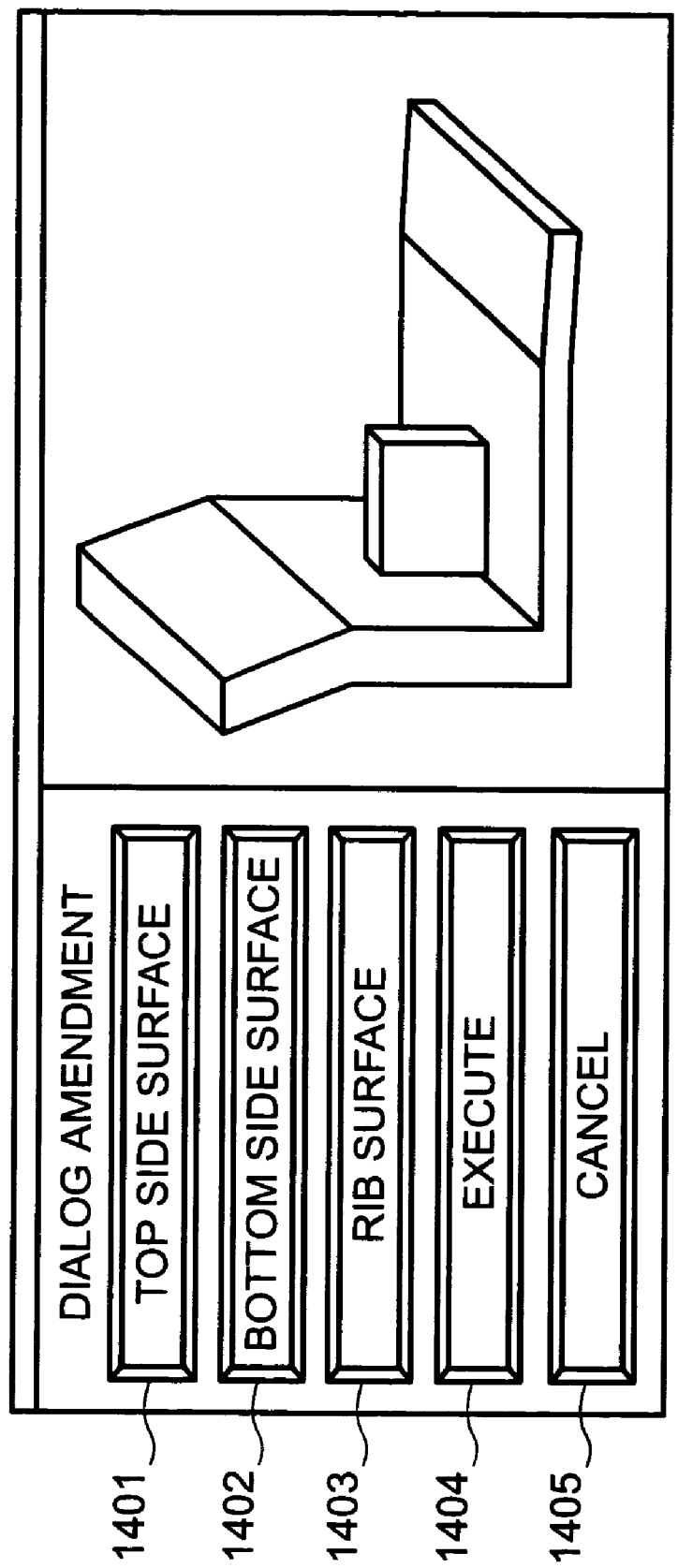

Explanation will be given on the processing of amending process of the top/bottom side rib attribute, which is conducted by means of the dialog top/bottom side rib attribute amending portion 117 in the producing apparatus, by referring to FIG. 14. As is shown in FIG. 14, on the screen of the input/output device 101, there is displayed a perspective view of the solid model in the right-hand side, while selection buttons are disposed, such as, a top side surface selection button 1401, a bottom side surface selection button 1402, and a rib surface selection button 1403, for example, on an operation screen disposed in the left-hand side. The user of the apparatus selects the surface, on which she/he wishes to make an amendment on the operation screen of the input/output apparatus 101. Next, the attribute after making the amendment therein is selected among those selection buttons 1401-1403. Finally, at the time when an execution button 1404 is pushed, the top/bottom side rib attribute being amended is registered into the top/bottom side rib attribute data 108. Or, if a cancel button 1405 is pushed down, the designation is released.

Explanation will be given on the processing as a whole of producing an analytical process model, while using examples in more details thereof, by referring to FIGS. 15-17. Herein, FIGS. 15 and 16 are detailed explanatory views of the amending process on the top/bottom side rib attribute, by means of the dialog top/bottom side rib attribute amending portion 117. And, FIG. 17 is a view for explaining the internal surface model, which is displayed by means of the internal-surface model displaying portion 118.

Figure 15A:
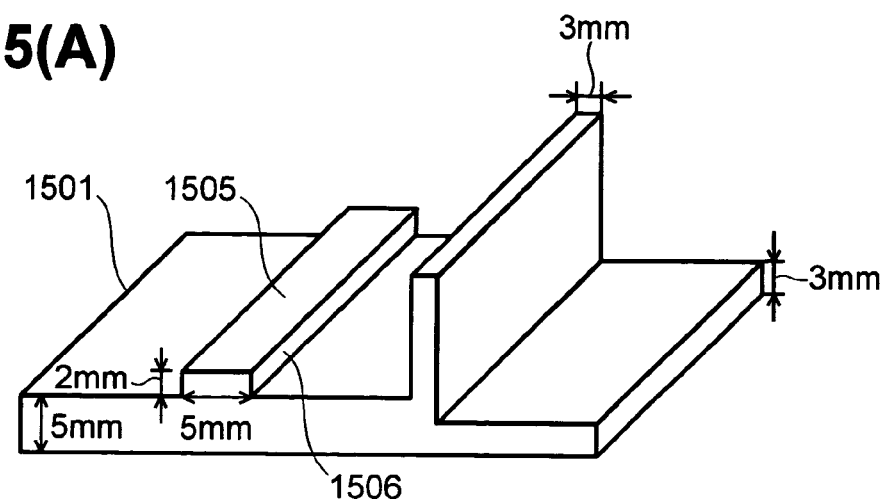
Figure 15B:
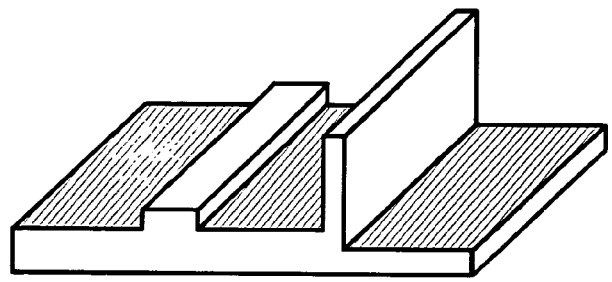
Figure 15C:
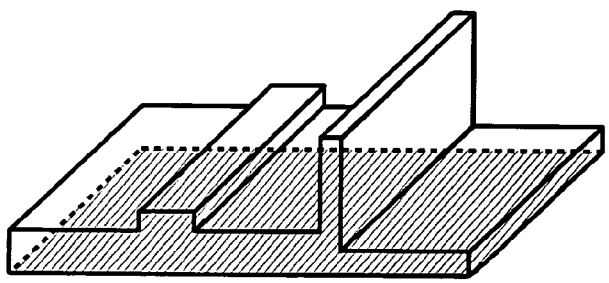

In the case of producing the analytical shell-model of a housing portion, as shown in FIG. 15(A), the user of the apparatus designates the reference-plate thickness size of the housing portion 1501. The thickness of this model is 3-5 mm, for example, it is designated to be 5 mm, herein. Then, the pair-surfaces are acknowledged by means of the pair-surface acknowledging portion 107, while the top/bottom side rib attribute is acknowledged by means of the top/bottom side rib attribute acknowledging portion 109, and the data acknowledged are stored into the top/bottom side rib attribute data 108. A meshed portion (i.e., actually, being displayed by changing the color thereof on the display) shown in FIG. 15(B) displays the top side surface, while that shown in FIG. 15(C) the bottom side surface, and FIG. 15(D) the rib surface, for example.

Figure 15D:
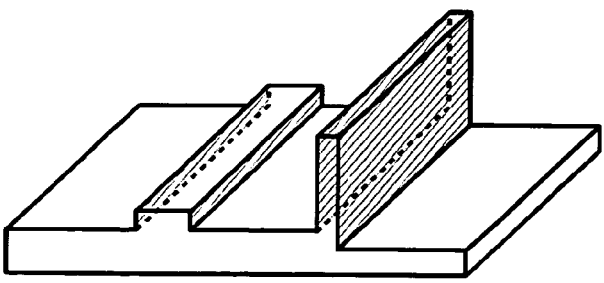

Herein, since the rib between the surfaces 1505 and 1506 is a small or minute rib, and if it is not desired to be acknowledged to be the rib, then the rib surface attribute can be released, by pushing the cancel button with designating the surface 1506 under the condition of the display shown in FIG. 15(D), with using the dialog top/bottom side rib attribute amending portion 117. Further, that case of not desiring to acknowledged it to be the rib is, for example, when it is the small or minute rib, so that no ill influence will be given on intensity if not acknowledging it to be the rib; such as, a small projection, for example. Not acknowledging this portion to be the rib enables reduction in the number of the meshes, and thereby shortening the time for strength analyzing, as well.

Figure 16A:
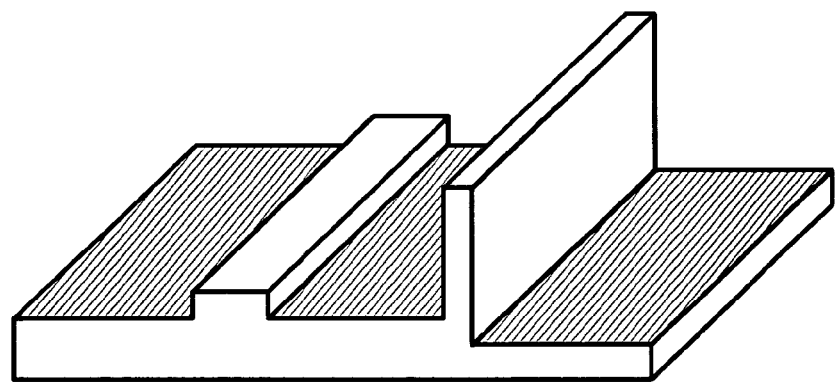
Figure 16B:
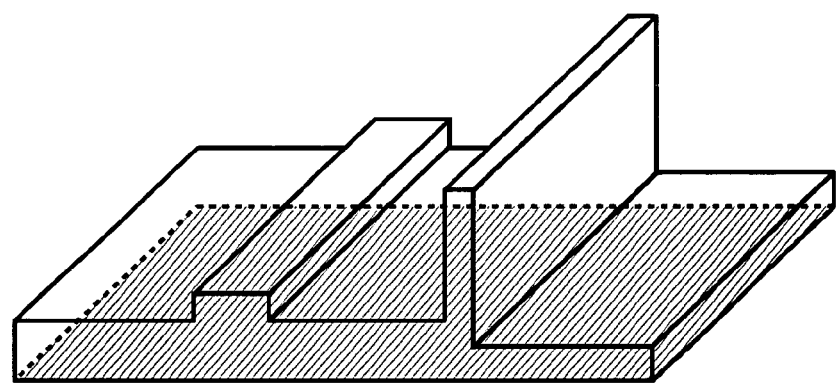
Figure 16C:
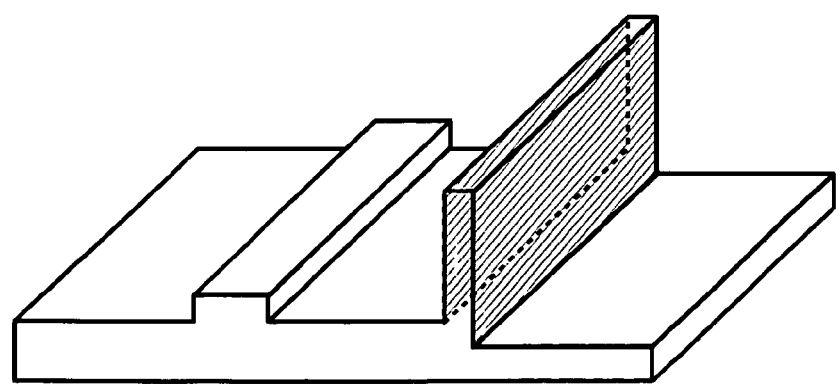
Figure 17:
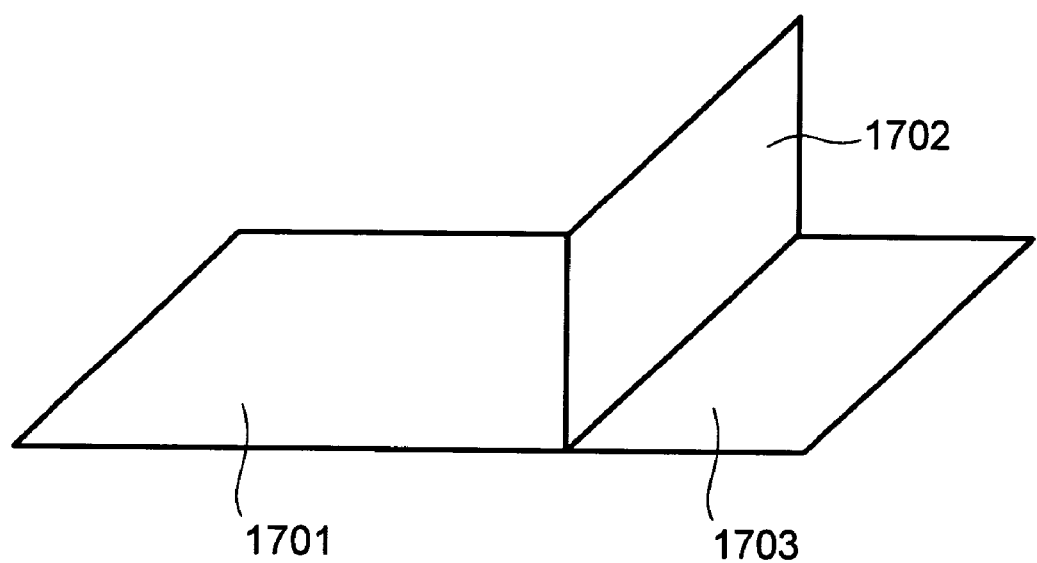

FIGS. 16(A)-16(C) show the attribute amended by means of the dialog top/bottom side rib amending portion 117. FIG. 16(A) displays the top side surface, FIG. 16(B) the bottom side surface, and FIG. 16(C) the rib surface, for example. The offset-surface producing portion 111 produces the offset-surface data. In the example in FIGS. 16(A)-16(C), the bottom side surface shown, in particular, shown in FIG. 16(B), is the offset target surface. Next, the seam-surface is produced by the seam-surface producing portion 113, and the internal-surface model data 114 is outputted by means of the internal-surface model producing portion 115.

FIG. 17 shows an example of the internal-surface model, which is displayed on the displaying portion of the input/output apparatus 110, by means of the internal-surface model displaying portion 118. The thickness attributes given to the internal-surface model are as below:

The surface 1701: 5 mm;
The surface 1702: 3 mm; and
The surface 1703: 3 mm.

However, in this example, it is assumed that the averaged value of the face-to-face distances is given as the thickness attribute.

In this manner, for the user of the apparatus, it is possible to produce the internal-surface model, as well as, to amend the internal-surface model in a manner of dialog, only by inputting the reference-plate thickness size, thereby enabling to produce the analyzing shell-model effectively.

As was explained in the above, according to the present embodiment, in case of producing the analytical shell-model from the configuration model of thin-plate structure, for the user of the apparatus, it is possible to produce the internal-surface model, as well as, to control and amend the internal-surface model, in the dialog manner, thereby enabling to produce the analyzing shell-model effectively.

Conventionally, since the thin-plate like configuration portion is designated by an operator, she/he must input designations of the configuration a number of times, in particular, when it has a rib or is the complicated configuration model, however according to the present embodiment, the internal-surface model can be produced, only by inputting the reference-plate thickness, easily. Also, conventionally, the neutral surface model is produced, not as the configuration model, but as the mesh data, therefore it is necessary to re-produce the configuration model form the mesh data when changing the configuration for a parameter survey, etc. However, according to the present embodiment, since the internal-surface model is produced as the configuration model, it is possible to change the configuration, easily, on the configuration of the internal-surface model produced, by conducting the operations, such as, the bending process and the drilling process, for example. Accordingly, it is possible to produce the analytical shell-model, easily.

What is claimed is:

1. An internal-surface model producing apparatus, for producing an internal-surface model for use in numerical analyzing from a configuration model, which is produced by a three-dimensional configuration modeler, comprising:

a reference-plate thickness size inputting means for inputting a reference-plate thickness size to be used when specifying a thin-plate portion from the configuration model;

a pair-surfaces acknowledging means for acknowledging two (2) surfaces as pair-surfaces data, being equal or less than the reference-plate thickness size, which is inputted by said reference-plate thickness size inputting means, in face-to-face distance between two (2) arbitrary surfaces constructing the configuration model;

a top-bottom side rib attributes acknowledging means for classifying the pair-surfaces data registered by said pair-surfaces acknowledging means into a top-side surface, a bottom-side surface and a rib surface, through producing a neighboring graph of connecting nodes themselves to the neighboring surfaces by edges, with presuming the surfaces to be nodes to the configuration model, and searching a loop including two (2) or more of the edges of a pair attribute, while determining a non-rib surface when the number of nodes within the loop is equal or less than four (4), and thereby registering the attributes as top-side surface data, bottom-side surface data, and rib surface data, respectively;

an offset surface producing means for producing surfaces by offsetting a group of surfaces of either one of the top-side surface data, the bottom-side surface data or the rib surface data, which are registered by said top-bottom side rib attributes acknowledging means, into a normal direction to an internal direction of each configuration, and for registering the surfaces offset as offset surface data;

a seaming surface producing means for producing a surface, by extending the offset surface data, which is produced from the rib surface by said offset surface producing means, until it intersects the offset surface data, which is produced from either of the top or the bottom surface, and for registering the surface data extending the offset surface data, which is produced from said rib surface, and the offset surface data, which is produced from either one of the top or the bottom surface, as seaming surface data; and an internal-surface model producing means for registering the seaming surface, which is registered by said seaming surface producing means as an internal-surface model.

2. The internal-surface model producing apparatus, as described in the claim 1, further comprising means for producing a thickness attribute of said internal-surface model from face-to-face distance between the surfaces of said pair of surfaces and the reference-plate thickness.

3. An internal-surface model producing apparatus for converting a configuration model produced by a three-dimensional configuration modeler into an internal-surface model for numerical analysis, comprising:

a reference-plate thickness inputting means for inputting a reference-plate thickness size to be used when specifying a thin-plate portion from the configuration model;

a pair-surfaces acknowledging means for acknowledging two (2) surfaces, being equal or less than the reference-plate thickness size, which is inputted by said reference-plate thickness inputting means, in face-to-face distance between two (2) arbitrary surfaces constructing the configuration model;

a top/bottom side rib attribute acknowledging means for acknowledging the two (2) surfaces acknowledged by said pair-surfaces acknowledging means to be one of a top side surface, a bottom side surface, and a rib surface;

an offset-surface producing means for producing an offset-surface by offsetting a group of surfaces on either the top side or the bottom side, which are acknowledged by said top/bottom side rib attribute acknowledging means, and the rib surface, respectively, in direction of a normal line towards the inside of the configurations thereof;

a seam-surface producing means for seaming between the offset-surface, which is produced from either the top or the bottom surface by means of said offset-surface producing means, and also the offset-surface produced from the rib surface; and an internal-surface producing means for registering the offset-surface seamed by said seam-surface producing means, as in a form of an internal-surface model.

4. The internal-surface model producing apparatus, as described in the claim 3, further comprising a top/bottom rib attribute emphatic displaying means for displaying the top side surface, the bottom side surface and the rib surface, which are acknowledged by said top/bottom side rib attribute acknowledging means, with making emphasis thereon.

5. The internal-surface model producing apparatus, as described in the claim 3, further comprising a dialog top/bottom side rib attribute amending means for amending the top side surface, the bottom side surface and the rib surface, which are acknowledged by said top/bottom side rib attribute acknowledging means, in a manner of dialog.

* * * * *